Nov. 2, 1937.                B. ENGSTROM                2,098,087
PIPE THREAD PROTECTOR
Filed June 18, 1936
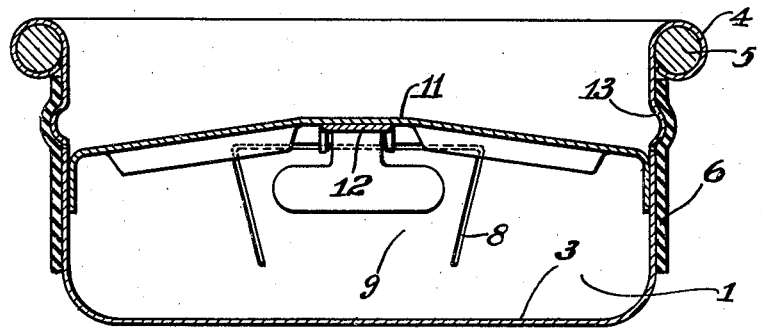
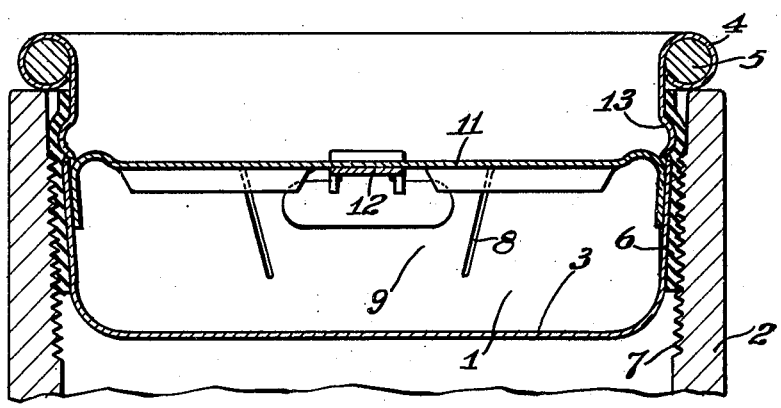
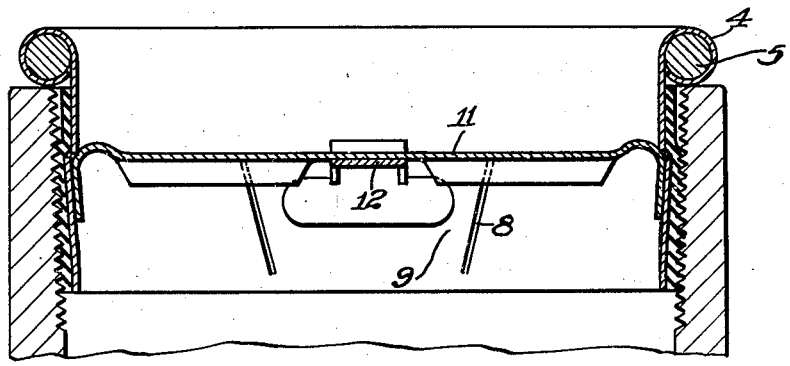
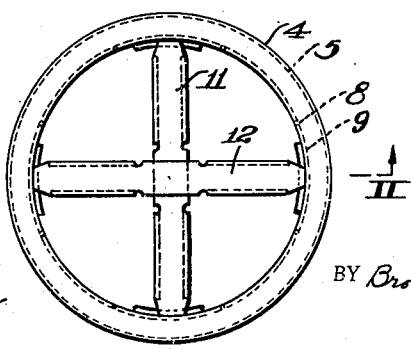
INVENTOR.
Berger Engstrom
BY Brown Critchlow & Flick
ATTORNEYS
WITNESSES Patented Nov. 2, 1937

2,098,087

UNITED STATES PATENT OFFICE 2,098,087

PIPE THREAD PROTECTOR

Birger Engstrom, Pittsburgh, Pa., assignor of sixty one-hundredths to Spang, Chalfant and Co., Incorporated, Pittsburgh, Pa., a corporation of Pennsylvania Application June 18, 1936, Serial No. 85,936

11 Claims. (Cl. 138—96)

This invention relates to a pipe thread protector and more particularly to a protector for use on the end of an internally threaded pipe or pipe coupling although it may be used to advantage on any hollow article having in it a circular opening whether threaded or not.

An object of the invention is to provide a protector of this character which may be used a plurality of times and which is both simple to manufacture and install, as well as exceptionally sturdy of construction. A further object is to provide a protector which may be firmly locked in place through the lateral displacement of only portions of its side walls and in such a way that its locking and releasing can be accomplished without the aid of any special tool.

A still further object is to provide it with a reinforced outer end for both protecting the extreme end of the pipe and itself against distortion in the event it is jammed against other objects in use.

Another object is to provide a protector embodying the aforementioned features which in addition to positively protecting the threads of the pipe also seals its end against the ingress of moisture or foreign objects.

These and other objects as well as the various other novel features and advantages of the invention will be apparent when the following detailed description is read in conjunction with the accompanying drawing, of which Fig. 1 is a plan view of a protector constructed in accordance with the invention; Fig. 2 is a sectional view taken on the line II—II of Fig. 1, Fig. 3 is a view similar to Fig. 2 but showing the protector engaged in the end of a pipe; and Fig. 4 is a view similar to Fig. 3 of a modified form of the invention.

Referring in detail to the drawing, the numeral 1 designates the body proper of the protector and the numeral 2 a pipe end which is shown by way of illustrating the way the protector is used. As illustrated the protector comprises principally a substantially cup-shaped metal shell. Preferably the inner end 3 of this shell is made continuous with the side walls so that it will completely enclose the end of the pipe, and its outer end is shaped in the form of a rounded bead 4 which projects over the extreme end of the pipe to protect the latter and also prevent its being itself distorted when it is jammed against something in service. To further enhance its strength in this respect a reinforcing ring 5 may be placed in the bead 4 and the latter turned around the ring when it is formed. Obviously the inner wall 3 of the shell may be eliminated in manufacturing, allowing for an open end protector as shown in Fig. 4, if so desired.

Around the outer periphery of the shell 1 there is mounted a yieldable covering 6 which is used to prevent damaging of the threads 7 on the pipe by contact with the sleeve and more firmly hold the protector in place once it is locked in the pipe as well as prevent a sealed contact with the threads. Such covering or liner is preferably made of some suitable fibrous or composition material, like cork or rubber and is either cemented or otherwise affixed to the shell.

To lock the protector in the pipe a plurality of slots 8 is cut in the side wall of the shell to provide lug segments 9 preferably of substantially inverted wedge shape, which may be forced out of the plane of the shell and thereby jam the covering 6 opposite thereto tightly against the threads of the pipe and hold the assembly firmly in position. These slots as shown, which may take other shapes and be otherwise arranged both as to number and position, are preferably arranged in diametric opposition to each other with one in each quadrant of the shell, and for moving them into and out of their clamped positions, struts 11 and 12 are connected between them. As shown the ends of these struts are secured to the segments 9 near the upper ends thereof and are normally bowed upwardly slightly when maintaining the segment in the plane of the side wall of the shell and are mounted one above the other so that they can be operated simultaneously.

As shown, their ends are attached to the segments 9 by being welded thereto although this connection may be effected in any suitable manner. When locking the protector in place these struts 11 and 12 are merely pressed downwardly by a suitable tool to the position shown in Figs. 2 and 3 in which position they are disposed in slightly downwardly flexed position, in which position they force segments 9 outwardly jamming the covering 6 tightly into the threads of the pipe. To remove the protector all that is necessary is to insert the end of a rod under the struts 11 and 12 and bend them back to the position shown in Fig. 1 by leverage action using the outer bead as a fulcrum. With the lugs 9 in the latter position the protector can be readily removed from the pipe as its outside diameter is so proportioned as to permit it to be readily inserted and removed without undue binding.

In certain pipes or pipe couplings the threads are not carried all of the way to the outer end and in such instance the sleeve 2 may be provided with a rib or outwardly turned shoulder 13 which is so located that it will not engage the threads but has an outside diameter so proportioned that it forces the covering 6 neatly against the inner wall of the pipe above the threads. This rib strengthens the shell and reduces the possibility of distortion or displacement of the beading 4 in relation to the pipe end. It also makes more positive the action of sealing the end of the pipe against moisture and foreign matter. On the other hand where the threads are extended all the way to the ends thereof as shown in Fig. 4, the rib 13 is dispensed with.

Among the advantages of this invention that will be apparent, it is simple of construction while at the same time susceptible of being made of relatively light material which makes for economy, and is also adapted to be reused with entire satisfaction a plurality of times.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A thread protector comprising a sleeve of metal or other suitable material which is adapted to fit closely within a hollow article, a segment cut out of the side wall thereof but attached thereto along at least one edge, and means for positively displacing said segment into an out of clamping engagement with the wall of the receiving article.

2. A thread protector according to claim 1 in which the segment is made in the shape of a dovetail.

3. A thread protector according to claim 1 having the surface thereof which contacts the protected article encased in a yielding covering.

4. A thread protector according to claim 1 which has a reinforced bead about its upper end for protecting the end of the article on which it is used and preventing its being easily deformed.

5. A thread protector comprising a sleeve of metal or other suitable material adapted to fit closely within a hollow interiorly threaded article, a plurality of segments retained at one end thereof cut out of the side wall of the sleeve at spaced peripheral intervals, and means for positively forcing the free ends of said segments tightly into and out of engagement with the inner wall of the protected article.

6. A thread protector comprising a sleeve adapted to fit closely within a hollow internally threaded article, a segment retained at one end thereof cut out of the side wall of the sleeve, and a normally bowed diametrically extending strut connected between the free ends of said segment and the opposite side of the sleeve, said strut being adapted to hold the free end of the segment out of engagement with the adjacent wall of the article being protected when it is in its release position and to positively force it there against when it is flexed in a direction opposite to its normal inclination.

7. A thread protector comprising a sleeve adapted to fit closely within a hollow article, a plurality of diametrically disposed segments cut out of the side wall of said sleeve but retained integral therewith along at least one edge thereof, and a normally bowed strut extending between and connected to said opposed pair of segments for forcing them into and out of clamping engagement with the wall of the protected article.

8. A thread protector according to claim 7 in which said struts are disposed one above the other in such relation as to permit their being actuated to clamp or disengage said segments by a single operation.

9. A thread protector comprising a substantially cup-shaped metallic sleeve adapted to fit closely within the article to be protected, a segment cut out of the side wall of said sleeve but affixed integrally thereto along at least one edge, means for moving the free end of said segment into and out of alignment with the wall of the sleeve to force it into and out of clamping engagement with the wall of the protected article, and a protecting bead at the outer end of the sleeve having a solid ring enclosed therein for enhancing its strength.

10. A protector according to claim 1 having an outwardly projecting rib thereon disposed close to but spaced from the outer end of the sleeve.

11. A thread protector comprising a metallic sleeve having four uniformly spaced cut-out segments in the side wall thereof, and means connected between opposed pairs of said segments for moving them into and out of alignment with the wall of the sleeve for clamping them against and releasing them from the wall of the protected article.

BIRGER ENGSTROM.